United States Patent [19]
Donohue

[11] 3,925,543
[45] Dec. 9, 1975

[54] ANTIBACTERIAL ORAL COMPOSITIONS CONTAINING PRESERVATIVE-ANTIOXIDANTS

[75] Inventor: John Donohue, Neshanic, N.J.

[73] Assignee: Colgate-Palmolive Company, New York, N.Y.

[22] Filed: Nov. 1, 1973

[21] Appl. No.: 411,706

[52] U.S. Cl.................................. 424/52; 424/54
[51] Int. Cl.² ... A61K 7/16; A61K 7/18; A61K 7/22
[58] Field of Search .............................. 424/49–58

[56] References Cited
UNITED STATES PATENTS

| | | | |
|---|---|---|---|
| 2,470,906 | 5/1949 | Taylor | 424/49 |
| 3,342,687 | 9/1967 | Gould | 424/52 |

*Primary Examiner*—Shep K. Rose
*Attorney, Agent, or Firm*—Robert L. Stone; Herbert S. Sylvester; Murray M. Grill

[57] ABSTRACT

Oral products containing bis-biguanido hexane antibacterial agents are disclosed which are effective in preventing the accumulation of bacterial plaque and which do not stain teeth. Incorporation of a suitable reducing agent, such as ascorbic acid, has been found to prevent dental staining while maintaining the activity of the bis-biguanido hexanes in oral products.

11 Claims, No Drawings

ANTIBACTERIAL ORAL COMPOSITIONS CONTAINING PRESERVATIVE-ANTIOXIDANTS

BACKGROUND OF THE INVENTION

This invention relates to oral compositions and, more particularly, to oral compositions containing bis-biguanido hexanes which do not stain teeth.

Bis-biguanido hexanes, and particularly, 1,6-di-(p-chlorophenyl biguanido)hexane (also known as chlorohexidine) and 1,6-bis(2-ethylhexyl biguanido)hexane are known to possess highly desirable effects in inhibiting the growth of Gram-positive microorganisms, such as *Lactobacillus acidophilus odontolyticus*, as well as of Gram-negative microorganisms. Additionally, the bis-biguanido hexanes have been found to be effective in preventing the formation of dental plaque calculus, gingivitis, and mouth odor.

However, clinical studies have indicated that these antibacterial agents concurrently stain teeth at levels established as effective for plaque reduction. Furthermore, incorporation of conventional oral product preservative systems has presented formulation problems due to chemical interactions with the bis-biguanido hexanes and their salts. Sodium benzoate, a commonly used preservative, has been found to be highly incompatible with bis-biguanido hexanes with regard to therapeutic activity as well as cosmetic stability.

SUMMARY OF THE INVENTION

Certain reducing agents have been discovered that do not react adversely with the bis-biguanido hexane compounds. Furthermore, the systems disclosed concurrently function in the role of antioxidants by virtue of their ability to inhibit dental stain formation by the bis-biguanido hexane compounds.

A number of reducing agents have been found to be effective in oral compositions containing bis-biguanido hexanes, particularly ascorbic acid.

Ascorbic acid is effective in preventing dental staining by the bis-biguanido hexanes while preserving their antibacterial activity, although ascorbic acid is inactivated at alkaline pH's. Ascorbic acid has thus been found suitable for oral products, particularly mouth-rinses, having a pH between about 5.0 and 6.5. The ascorbic acid is generally present in amounts ranging from about 0.1% to about 5% by weight.

Any nontoxic, antibacterial, water-soluble salt of the bis-biguanido hexanes may be employed in the practice of the instant invention. Examples thereof include water-soluble salts of 1,6-di-(p-chlorophenyl biguanido)hexane and 1,6-bis(2-ethyl-hexyl biguanido)hexane. The preferred acid addition salts are the digluconate, diacetate, dihydrogen fluoride, dimonofluorophosphate, dihydrogen chloride, and the like. The salts of 1,6-bis(2-ethyl-hexyl biguanido)hexane are more soluble in lower alcohols such as ethanol than in water, and thus are generally employed in alcohol solution. For the purposes herein, "water-soluble" means sufficiently soluble to provide at least 0.0015% by weight of free agent to the solution.

The antibacterial agent is employed in amounts such that the oral product contains between about 0.0015% and 15% by weight of the agent. Typically, the finished oral product contains about 0.001 to about 5.0% by weight, preferably about 0.01 to about 5.0% by weight, and most preferably about .025% to 1.0% by weight of the agent. These amounts refer to the quantity of the free base form of the agent.

In certain forms of the invention the oral preparation may be substantially liquid in character, such as a mouth wash or rinse. In such a preparation the vehicle is typically a water-alcohol mixture. Generally, the ratio of water to alcohol is in the range of from about 1:1 to about 20:1, preferably from 3:1 to 20:1 and most preferably about 17:3, by weight. The total amount of water-alcohol mixtures in this type of preparation is typically in the range from about 70% to about 99.9% by weight of the preparation. The pH of such liquid preparations is generally in the range of from about 4.5 to about 7, and typically from about 5.5 to 7. The pH is preferably in the range of from about 5.0 to about 6.5.

Such liquid oral preparations may also contain a surface active agent and/or a fluorine-providing compound.

In certain other forms of this invention, the oral preparation may be substantially solid or pasty in character, such as a toothpowder, or a toothpaste or dental cream. The vehicle of such solid or pasty oral preparations contains polishing material. Examples of polishing materials are water-insoluble sodium metaphosphate, potassium metaphosphate, tricalcium phosphate, dihydrated calcium phosphate, anhydrous dicalcium phosphate, dicalcium phosphate, calcium pyrophosphate, magnesium othophosphate, trimagnesium phosphate, calcium carbonate, alumina, aluminum silicate, zirconium silicates, silica, bentonite, and mixtures thereof. Preferred polishing materials include crystalline silica having particles sizes of up to 5 microns, a mean particle size up to 1.1 microns, and a surface area of up to 50,000 $cm^2/gm$., insoluble sodium metaphosphate, anhydrous dicalcium phosphate, and calcium carbonate, which typically are finely divided and have an average particle size below 10 microns.

Alumina, particularly the hydrated alumina sold by Alcoa as C333, which has an alumina content of 64.9% by weight, a slica content of 0.008%, a ferric oxide content of 0.003%, and a moisture content of 0.37% at 110°C., and which has a specific gravity of 2.42 and a particle size such that 100% of the particles are less than 50 microns and 84% of the particles are less than 20 microns, is particularly desirable.

When visually clear gels are employed, a polishing agent of colloidal silica, such as those sold under the trademark SYLOID as Syloid 72 and Syloid 73 or under the trademark SANTOCEL as Santocel 100 and alkali metal aluminosilicate complexes are particularly useful, since they have refractive indices close to the refractive indices of gelling agent-liquid (including water and/or humectant) systems commonly used in dentifrices.

Many of the so-called "water-insoluble" polishing materials are anionic in character and also include small amounts of soluble material. Thus, insoluble metaphosphate may be formed in any suitable manner, as illustrated by Thorpe's *Dictionary of Applied Chemisty*, Volume 9, 4th Edition, pp. 510–511. The forms of insoluble metaphosphate known as Madrell's salt and Kurrol's salt are further examples of suitable materials. These metaphosphate salts exhibit a minute solubility in water, and therefore are commonly referred to as insoluble metaphosphates. There is present therein a minor amount of soluble phosphate material as impurities, usually a few percent such as up to 4% by weight. The amount of soluble phosphate material, which is believed to include a soluble sodium trimetaphosphate in the case of insoluble sodium metaphosphate, may be reduced by washing with water if desired. The insoluble alkali metal metaphosphate is typically employed in powder form of a particle size such that no more than 1% of the material is larger than 37 microns.

The polishing material is generally present in amounts ranging from about 20% to about 99% by weight of the oral preparation. Preferably, it is present in amounts ranging from about 20% to about 75% in toothpaste, and from about 70% to about 99% in toothpowder.

In the preparation of toothpowders, it is usually sufficient to admix mechanically, e.g., by milling, the various solid ingredients in appropriate quantities and particle sizes.

In pasty oral preparations the combination of the bisbiguanido hexane antibacterial agent and reducing agent is compatible with the other components of the preparation. Thus, in a toothpaste, the liquid vehicle may comprise water, typically in an amount ranging from about 10% to about 90% by weight of the preparation. Glycerine, sorbitol, or polyethylene glycol may also be present as humectants or binders. Particularly advantageous liquid ingredients comprise mixtures of water, glycerine and sorbitol.

In clear gels where the index is an important consideration, about 10–30% by weight of water, 0 to about 80% by weight of glycerine, and about 20–80% by weight of sorbitol is preferably employed. A gelling agent, such as natural or synthetic gums or gum-like materials, typically Irish moss, sodium carboxymethylcellulose, methyl cellulose, or hydroxyethyl cellulose, or hydroxyethyl cellulose, may be employed. Other gelling agents which may be employed include synthetic inorganic silicated clay sold under the trademark LAPONITE as Laponite CP and Laponite SP, having the formula $[Si_8Mg_{5.1}Li_{0.6}H_{7.6}O_{24}]^{0.6-}Na_{0.6+}$, gum tragacanth, polyvinylpyrrolidone, and starch. They are usually present in toothpaste in an amount up to 10% by weight, preferably in the range of from about 0.5% to about 5%. The preferred gelling agents are methyl cellulose and hydroxyethyl cellulose. In a toothpaste or gel, the liquids and solids are proportioned to form a creamy or gelled mass which is extrudable from a pressurized container or from a collapsible, e.g., aluminum or lead, tube.

The solid or pasty oral preparation may also contain a surface active agent and/or a fluorine-providing compound.

Surface active agents which may be employed are organic materials and afford increased prophylactic action, and assist in achieving thorough and complete dispersion of the preparation throughout the oral cavity. It is preferred to employ as the surface active agent a compatible detersive material which imparts to the preparation both detersive and foaming properties. The organic surface active material may be anionic, nonionic, ampholytic, or cationic in nature. Suitable such detergents are water-soluble salts of higher fatty acid monoglyceride monosulfates, such as the sodium salt of the monosulfated monoglyceride of hydrogenated coconut oil fatty acids; higher alkyl sulfates, such as sodium lauryl sulfate; alkyl aryl sulfonates, alkyl aryl sulfonates, such as sodium dodecyl benzene sulfonate; higher alkyl sulfonacetates; higher fatty acid esters of 1,2-dihydroxy propane sulfonates; and substantially saturated higher aliphatic acyl amides of lower aliphatic amino carboxylic acids such as those having 12 to 16 carbons at the fatty acid, alkyl or acyl radicals.

Nonionic surface active agents include condensates of sorbitan mono-oleate with from 20 to 60 moles of ethylene oxide (e.g., "Tweens"), condensates of ethylene oxide with propylene oxide, condensates of propylene glycol ("Pluorinics"), and amphoteric agents such as quaternized imidazole derivatives which are available under the trademark MIRANOL such as Miranol C2M.

Other suitable nonionic detergents are the condensation products of an $\alpha$-olefin oxide containing 10 to 20 carbon atoms, a polyhydric alcohol containing 2 to 10 carbons and 2 to 6 hydroxyl groups and either ethylene oxide or a heteric mixture of ethylene oxide and propylene oxide. The resultant detergents are heteric polymers having a molecular weight in the range of 400 to about 1600 and containing 40% to 80% by weight of ethylene oxide, with an $\alpha$-olefin oxide to polyhydric alcohol mole ratio in the range of about 1:1 to 1:3. These detergents are manufactured using well-known polymerization techniques under conditions of high temperature and high pressure. The olefin oxide and polyhydric alcohol usually are added to the reactor prior to the addition of ethylene oxide. These nonionic detergents may be mixed with similar nonionic detergents as well as other type nonionic detergents described herein.

Cationic surface active germicides and antibacterial compounds such as di-isobutylhexoxyethoxyethyl dimethyl benzyl ammonium chloride, benzyl dimethyl stearyl ammonium chloride, tertiary amines having one fatty alkyl group (of from 12 to 18 carbon atoms) and two poly (oxyethylene) groups attached to the nitrogen (typically containing a total of from 2 to 50 ethenoxy groups per molecule) and salts thereof with acids, and compounds of the structure.

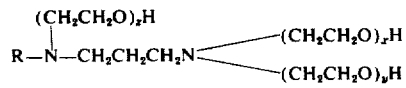

where R is a fatty alkyl group containing from 12 to 18 carbon atoms, and $x$, $y$, and $z$ total 3 or higher, as well as salts thereof with mineral or organic acids, may also be used.

It is preferred to use from 0.05% to 5% by weight of surface active material in the oral preparations according to the present invention.

In certain forms of this invention a fluorine-providing compound is present in the oral preparation. These compounds may be slightly soluble in water or may be fully water-soluble. They are characterized by their ability to release fluoride ions in water and by substantial freedom from reaction with other compounds of the oral preparation. Among these materials are inorganic fluoride salts, such as soluble alkali metal, alkaline earth metal, and heavy metal salts, for example, sodium fluoride, potassium fluoride, ammonium fluoride, lead fluoride, a copper fluoride such as cuprous fluoride, zinc fluoride, a tin fluoride such as stannic fluoride or stannous chlorofluoride, barium fluoride, sodium fluorosilicate, ammonium fluorosilicate, sodium fluorozirconate, sodium monofluorophosphate, aluminum mono- and di-fluorophosphate, and fluorinated sodium calcium pyrophosphate. Alkali metal and tin fluorides, such as sodium and stannous fluorides and mixtures thereof, are preferred.

The amount of the fluorine-providing compound is dependent to some extent upon the type of compound, its solubility, and the type of oral preparation, but it must be a nontoxic amount. In a solid oral preparation, such as a toothpaste or toothpowder, an amount of such compound which releases a maximum of 1% by weight of the preparation is considered satisfactory. Any suitable minimum amount of such compound may be used, but it is preferable to employ sufficient compound to release from 0.005% to 1%, and preferably about 1.0% of fluoride ion. Typically, in the cases of alkali metal fluorides and stannous fluoride, this component is present in an amount up to 2% by weight, based on the weight of the preparation, and preferably in the range of from 0.05% to 1%. In the case of sodium monofluorophosphate, the compound may be present in an amount up to 7.6% by weight, more typically 0.76%.

In a liquid oral preparation such as mouthwash, the fluorine-providing compound is typically present in an amount sufficient to release up to 0.13%, preferably from 0.0013% to 0.1%, and most preferably from 0.0013% to 0.05%, by weight, of fluoride ion.

In certain forms of this invention an additional antibacterial agent in addition to the bis-biguanido hexane may be present in amount to provide a total of about 5% by weight of antibacterial agent. Such additional antibacterial agents include:

$N^1$-(4-chlorobenzyl)-$N^5$-(2,4-dichlorobenzyl)biguanide p-chlorobenzyl biguanide 4-chlorobenzyl biguanide 4-chlorobenzhydrylguanyl urea N-3-lauroxypropyl-$N^5$-p-chlorobenzylbiguanide 1-(lauryldimethylammonium)-8-(p-chlorobenzyl dimethylammonium)octane dichloride 5,6-dichloro-2-guanidobenzimidazole $N^1$-p-chlorophenyl-N-$^5$-laurylbiguanide 5-amino-1,3-bis(2-ethylhexy)-5-methylhexahydropyrimidine and their nontoxic addition salts, particularly those where the anion includes a fluorine atom, such as fluoride, monofluorophosphate, hexafluorosilicate, and hexafluoroaluminate. The dihydrogen fluoride is preferred.

The total amount of antibacterial agents in the oral preparation will generally be in the range of 0.01% to 5% by weight, and a major amount (i.e., more than 50% by weight) of the antibacterial agent is desirably a bis-biguanido hexane, and the additional antibacterial agent is present in a minor amount.

Various other materials may be incorporated in the oral preparations of this invention. Examples are whitening agents, preservatives, silicones, chlorophyll compounds, and ammoniated material such as urea, diammonium phosphapte, and mixtures thereof. These adjuvants, where present, are incorporated in the preparations in amounts which do not substantially adversely affect the properties and characteristics desired.

Any suitable flavoring or sweetening materials may also be employed. Examples of suitable flavoring constituents are flavoring oils, e.g., oils of spearmint, peppermint, wintergreen, sassafras, clove, sage, eucalptus, marjoram, cinnamon, lemon, and orange, and methyl salicylate. Suitable sweetening agents include sucrose, lactose, maltose, sorbitol, sodium cyclamate perillartine, and saccharin. Suitably, flavor and sweetening agents may together comprise from 0.01% to 5% or more of the preparation.

In the manufacture of dentifrices, it is conventional to remove entrained air from the product by deaeration under vacuum, typically at a late stage in the manufacture. In an aspect of the instant invention, it has been observed that in clear dentifrice gels of suitable viscosity, the dispersed immobile air bubbles desirably enhance the appearance of the dentifrice, and can, therefore, be permitted to remain. Alternatively, the air can be replaced with another gas in nontoxic quantity, such as nitrogen or carbon dioxide. In particular, carbon dioxide can provide an effervescent character to the dentifrice.

In the event that it is desired to have a minimum amount of air in the dentifrice of the instant invention, the "Unimix" apparatus described in *Process Engineering*, Sept. 11, 1970, pages 81–85, is particularly efficacious for this purpose. In this apparatus a mixing tool can be rotated in a clockwise or counterclockwise manner, and the action of the mixing tool is followed by the action of a scraper blade to ensure that the working surface of the apparatus is scraped clean. Preferably a plastic such as polytetrafluoroethylene is used as the scraper since it is compatible with the various ingredients of the dentifrice. The positioning of the mixing tool and the scraper from a raised central column in the apparatus and the further presence of a hydraulically operated vacuum tight lid permits but little air to enter the formulation during processing. Thus, gelling agent and a portion of the liquid including water and/or humectant can be efficiently blended in the Unimix apparatus. Then the remaining water and liquid can be separately blended with the polishing agent and additional components (except for post-added components, such as flavoring oil) in the Unimix, and the two dispersions then blended together in the Unimix. If desired, the small amount of air present can be largely removed under the depressurized conditions in the apparatus. The apparatus can be used to blend ingredients at room temperature as well as at higher temperatures.

DESCRIPTION OF THE PREFERRED EMBODIMENTS

Example I

A mouthrinse was prepared by mixing together the following ingredients:

| | Percent by weight |
|---|---|
| Ethanol with flavoring | 15.00 |
| *Tween 80 | 0.50 |
| Glycerine | 10.00 |
| Ascorbic acid | 0.50 |
| Chlorhexidine digluconate (20% w/v solution) | 0.236 |
| Water (deionized) | 72.314 |
| Sodium saccharin | 0.02 |
| Sodium hydroxide (1.25 molar) | 1.43 |

*condensate of sorbitan mono-oleate with 20 moles of ethylene oxide

The final pH of the mouthrinse should be adjusted to between 5.5 and 6.0 with sodium hydroxide.

The above mouthrinse was subjected to accelerated aging at 120°F. to determine acidity of the chlorhexidine digluconate in the formulation. The results, as determined by chemical assay, are tabulated below:

| Weeks aged at 120°F. | % Activity |
| --- | --- |
| 0 | 100 |
| 3 | 72 |
| 6 | 76 |
| 9 | 48 |

The above ascorbic acid-stabilized mouthrinse has been found to compare favorably in reduction of plaque with unstabilized chlorohexidine gluconate mouthrinse. Chemical and microbial assays performed show some reduction of activity of the mouthrinse when stabilized with ascorbic acid, although this disadvantage is offset by the reduction in staining of the ascorbic acid-stabilized mouthrinse.

| Digluconate | % Activity | |
| --- | --- | --- |
| | Chemical Assay | Microbial Assay |
| Chlorhexidine gluconate | 100 | 100 |
| Chlorhexidine gluconate and ascorbic acid | 81 | 81 |

The mouthrinse of Example I was compared with a control mouthrinse of the same formulation, without the ascorbic acid stabilizer, for staining, and a negative control mouthrinse without the chlorhexidine digluconate.

Two groups of nine members each were allocated a rinse which was used 3 times a day for 6 weeks after brushing with conventional toothpaste.

Tooth staining was scored 6—6 for upper and lower jaws, interdentally, and for buccal and lingual surfaces after 3 weeks and after 6 weeks using the following rating scale:

| Score: | 0 | 1 | 2 | 3 |
| --- | --- | --- | --- | --- |
| Staining: | none | light | medium | heavy |

The results of the test are as follows:

| | Example I Mouthrinse | Positive Control | Negative Control |
| --- | --- | --- | --- |
| Baseline | 0.78 | 0.78 | 0.77 |
| Test period 3 weeks | 0.88 | 0.99 | 0.80 |
| Test period 6 weeks | 0.92 | 1.05 | 0.88 |
| Overall test period | 0.90 | 1.02 | 0.84 |

The mouthrinse of Example I was thus shown to produce significantly less staining than the positive control mouthrinse, showing that the ascorbic acid was effective in reducing staining of a chlorhexidine-containing mouthrinse. There was not a significant difference in staining between the negative control and the ascorbic acid chlorhexidine mouthrinse of Example I.

A study was run to evaluate the efficacy of mouthrinse containing 0.044% chlorhexidine digluconate and 0.044% chlorhexidine digluconate and 0.5% ascorbic acid. The percent reduction in dental plaque accumulation attributable to the chlorhexidine digluconate was 66% (significant at the 0.01 level). The percent reduction in dental plaque accumulation attributable to the chlorhexidine digluconate with ascorbic acid was 42% (significant at the 0.05 level). The control mouthrinse contained 0.5% ascorbic acid but no chlorhexidine digluconate.

Example II

A mouthrinse was prepared by mixing together the following ingredients:

| | Percent by weight |
| --- | --- |
| Ethanol with flavor | 15.000 |
| *Pluronic F108 | 2.000 |
| Glycerine | 10.000 |
| Ascorbic acid | 0.500 |
| Chlorhexidine digluconate (20% w/V solution) | 0.236 |
| Water (deionized) | 70.814 |
| Sodium saccharin | 0.020 |
| Sodium hydroxide | 1.430 |

*a nonionic surfactant

The final pH of the above mouthrinse is adjusted to between 5.5 and 6.0 with sodium hydroxide. This mouthrinse shows an acceptable shelf life when subjected to accelerated aging.

Example III

A stable, antibacterial mouthrinse was prepared by mixing together the following ingredients:

| | Percent by weight |
| --- | --- |
| Ethanol with flavoring | 15.00 |
| Nonionic surfactant | 2.00 |
| Glycerine | 10.00 |
| Ascorbic acid | 0.50 |
| Chlorhexidine digluconate (20% w/v solution) | 0.236 |
| Water (deionized) | 70.814 |
| Sodium saccharin | 0.02 |
| Sodium hydroxide (1.25 molar) | 1.43 |

The final pH of the mouthrinse was adjusted to between 5.5 and 6.0 with the sodium hydroxide.

Example IV

A mouthrinse concentrate was made by combining the following ingredients:

| | Percent by weight |
| --- | --- |
| Glycerine | 83.407 |
| Ascorbic acid | 1.500 |
| Chlorhexidine diacetate powder | 0.093 |
| Ethanol with flavor | 15.000 |

Ten grams of water should be added to 5 grams of the concentrate to yield a typical 15 gram dose.

Example V

A mouthrinse concentrate was prepared from the following ingredients:

| | Percent by weight |
| --- | --- |
| Glycerine | 97.691 |
| Ascorbic acid | 1.500 |
| Chlorhexidine diacetate powder | 0.093 |
| Sodium bicarbonate | 0.716 |

Ten grams of water are added to 5 grams of the above concentrate to yield a typical 15 gram dose.

Example VI

A dentifrice was prepared from the following ingredients:

| | Percent by weight |
|---|---|
| Glycerine | 20.000 |
| Hydroxyethylcellulose | 1.300 |
| Sodium saccharin | 0.200 |
| Water (deionized) | 18.875 |
| Ascorbic acid | 1.000 |
| *Miranol HS concentrate | 1.000 |
| Chlorhexidine digluconate (20% w/v solution | 4.725 |
| Hydrated alumina | 52.000 |
| Flavor | 0.900 |

*imidazoline-derived amphoteric-sulfonated surface active agent wherein the fatty acid radical is a pure lauric acid derivative Example VII

| | Percent by weight |
|---|---|
| Glycerine | 22.0 |
| Hydroxyethylcellulose | 1.3 |
| Sodium saccharin | 0.20 |
| Water (deionized) | 16.375 |
| Ascorbic acid | 1.0 |
| Nonionic surfactant | 1.5 |
| Chlorhexidine digluconate | 4.725 |
| Hydrated alumina | 52.00 |
| Flavor | 0.90 |

What is claimed is:

1. An oral dental plaque and stain formation preventing preparation consisting essentially of an aqueous vehicle having a pH in the range of about 4.5 to about 7 which aqueous vehicle contains from about 0.001 percent to 5 percent by weight of a non-toxic water-soluble bis-biguanido hexane compound as antibacterial dental plaque formation preventing agent which is selected from the group consisting of 1,6-di-(p-chlorophenyl biguandio) hexane, 1,6-bis-(2-ethylhexyl biguanido) hexane and salts thereof, and about 0.1 percent to 5 percent by weight of ascorbic acid as a stabilizing agent which is effective to inhibit dental stain formation otherwise caused by said antibacterial agent at levels established as effective for plaque reduction.

2. The oral preparation of claim 1 wherein the bis-biguanido hexane compound is present in amount of about 0.1 percent to 1 percent by weight.

3. The oral preparation of claim 2 wherein the antibacterial agent is a water-soluble salt of 1,6-di-(p-chlorophenyl biguanido)hexane.

4. The oral preparation of claim 1 wherein the oral preparation contains an additional antibacterial agent which is present in minor amount with respect to the bis-biguanido hexane compound and the total amount of antibacterial agents is up to 5% by weight.

5. The oral preparation of claim 2 wherein the vehicle contains a mixture of water and alcohol in a ratio of from about 1:1 to about 20:1 by weight and said oral preparation is a mouthwash.

6. The oral preparation of claim 5 wherein the vehicle contains a fluorine-providing compound in amount sufficient to release from 0.005 percent to 1 percent by weight of fluoride ion.

7. The oral prepartion of claim 6 wherein the fluorine-providing compound is stannous fluoride.

8. The oral preparation of claim 6 wherein the fluorine-providing compound is sodium fluoride.

9. The oral preparation of claim 6 wherein the fluorine-providing compound is sodium monofluorophosphate.

10. The oral preparation of claim 5 wherein the vehicle contains from 0.05 percent to 5 percent by weight of a surface active agent.

11. The oral preparation of claim 10 wherein the surface active agent is a nonionic surface active agent.

* * * * *